(12) United States Patent
Cao et al.

(10) Patent No.: US 11,641,721 B2
(45) Date of Patent: May 2, 2023

(54) DISPLAY APPARATUS

(71) Applicant: BOE Technology Group Co., Ltd., Beijing (CN)

(72) Inventors: Lei Cao, Beijing (CN); Jinggang Wei, Beijing (CN); Wenbin Wang, Beijing (CN); Junmin Sun, Beijing (CN); Yunpeng Wu, Beijing (CN); Zifeng Wang, Beijing (CN); Yan Ren, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/409,825

(22) Filed: Aug. 24, 2021

(65) Prior Publication Data
US 2022/0087036 A1     Mar. 17, 2022

(30) Foreign Application Priority Data

Sep. 16, 2020   (CN) .......................... 202022032707.4

(51) Int. Cl.
| | | |
|---|---|---|
| *G06F 1/16* | (2006.01) | |
| *H05K 5/00* | (2006.01) | |
| *G02F 1/167* | (2019.01) | |

(52) U.S. Cl.
CPC .......... *H05K 5/0017* (2013.01); *G06F 1/163* (2013.01); *G06F 1/1626* (2013.01); *G02F 1/167* (2013.01)

(58) Field of Classification Search
CPC ....... G06F 1/163; G06F 1/1626; G06F 1/1633
See application file for complete search history.

(56) References Cited

U.S. PATENT DOCUMENTS

| | | | |
|---|---|---|---|
| 2014/0090209 A1* | 4/2014 | Smith ..................... | A45F 5/004 248/314 |
| 2019/0253540 A1* | 8/2019 | Fan ..................... | H04M 1/0237 |

* cited by examiner

*Primary Examiner* — Anthony Q Edwards
*Assistant Examiner* — Bryan Van Huynh
(74) *Attorney, Agent, or Firm* — Ling Wu; Stephen Yang; Ling and Yang Intellectual Property

(57) ABSTRACT

Provided is a display apparatus, including: housing components, and a display screen and a circuit board disposed in the housing components, wherein the housing components include a middle frame, a front case and a rear case; the middle frame includes a frame body and a plate body, wherein the frame body includes a first frame and a second frame opposite to each other, and a third frame connected between the first frame and the second frame; the frame plate is disposed around a corresponding side of the plate body, and both the first frame and the second frame are provided with protruding parts protruding from a first side of the plate body; the rear case is fixed between the two protruding parts and connected to the first side of the plate body; the display screen is disposed in the frame body and fixed on the plate body.

20 Claims, 5 Drawing Sheets

DISPLAY APPARATUS

CROSS-REFERENCE TO RELATED APPLICATION

The present application claims the priority of Chinese Patent Application No. 202022032707.4 filed to the CNIPA on Sep. 16, 2020, the content of which is incorporated herein by reference.

TECHNICAL FIELD

Embodiments of the present disclosure relate to, but are not limited to a field of display apparatus technologies, specifically to a display apparatus.

BACKGROUND

The application of electrophoretic display (EPD) technology is becoming increasingly popular, and a badge is one of the application scenarios, which makes the display information of the badge replaceable. Compared with traditional card badge, electronic badge may be reused. Some electronic display badges have disadvantages of heavy total weight, high cost and poor signal.

SUMMARY

The following is a summary of subject matter described in detail in the present disclosure. This summary is not intended to limit the protection scope of the claims.

An embodiment of the present disclosure provides a display apparatus, including: housing components, and a display screen and a circuit board disposed in the housing components, wherein the housing components include a middle frame, a front case and a rear case; the middle frame includes a frame body and a plate body, wherein the frame body includes a first frame and a second frame opposite to each other, and a third frame connected between the first frame and the second frame; the frame plate is disposed around a corresponding side of the plate body, and both the first frame and the second frame are provided with protruding parts protruding from a first side of the plate body; the rear case is fixed between the two protruding parts and connected to the first side of the plate body; the display screen is disposed in the frame body and fixed on the plate body; the circuit board is disposed on a side of the display screen away from the display side and fixedly connected to the rear case; the front case is fixed in the frame body and located on a display side of the display screen.

In an exemplary embodiment, the frame body is substantially U-shaped; the first frame and the second frame are disposed parallel to each other, and the first frame and the second frame are perpendicular to the third frame.

In an exemplary embodiment, the first frame, the second frame, and the third frame are all provided with first support ribs, and a part of an inner side of the front case close to an edge is supported and fixed on the first support rib.

In an exemplary embodiment, the first support ribs on the first frame, the second frame and the third frame all extend along length directions of corresponding frames and are connected into an integrated structure.

In an exemplary embodiment, the front case is disposed to cover the display screen, and includes a transparent region in the middle and a non-transparent region around the transparent region, and the transparent region corresponds to the display region of the display screen.

In an exemplary embodiment, the front case is a whole solid body with a plate-like structure or a frame-like structure.

In an exemplary embodiment, a width of the two protruding parts in the direction perpendicular to the plate body is larger than a thickness of the plate body, and both protruding parts is disposed to protrude from a side of the plate body away from the display screen.

In an exemplary embodiment, a first side of the plate body is provided with a folding rib extending toward a side of the plate body away from the display screen, and a side of the rear case connected to the first side of the plate body is provided with a flanging extending toward an inner side of the rear case, the flanging presses against the folding rib, and a side of the rear case away from the first side of the plate body is connected to a corresponding side of the front case.

In an exemplary embodiment, opposite sides of the two protruding parts are provided with second support ribs, and a part of an inner side of the rear case close to an edge is supported and fixed on the second support ribs.

In an exemplary embodiment, the second support ribs extend along length directions of the two protruding parts, ends of the two protruding parts away from the third frame are provided with arc ribs; the first support ribs on the first frame and the second support ribs are connected to a whole by the arc ribs on the protruding parts of the first frame, and first supporting ribs on the second frame and the second supporting ribs are connected to a whole by the arc ribs on the protruding parts of the second frame.

In an exemplary embodiment, a buckle is disposed on a part of an inner side of the rear case close to an edge, and the buckle snap-fits the second support rib.

In an exemplary embodiment, the display apparatus further includes two lug components respectively disposed on the two protruding parts, and a lug component include a lug plate disposed at an end of a protruding part away from the third frame, and the lug plate is provided with a hanging hole, and the hanging hole is disposed for connecting a hanging rope.

In an exemplary embodiment, the protruding part is provided with a first connecting hole; the lug plate may be provided with a second connecting hole; and the lug component further includes a pin and a fastener, wherein the pin is disposed through the first connecting hole and the second connecting hole; an end is clamped on the lug plate, and the clamping member is fixed on the other end of the pin and clamped on the protruding part.

In an exemplary embodiment, two lug plates of the two lug components are respectively connected to sides of the two protruding parts facing away from each other, and the clamping member is disposed to prevent the pin from moving in an axial direction, and the two lug plates are capable of rotating on the pin.

In an exemplary embodiment, a circumferential surface of the pin is provided with an annular clamping groove, and the clamping member snap-fits into the annular clamping groove and is stuck in a corresponding protruding part.

In an exemplary embodiment, the lug component further includes a flexible gasket disposed through the pin, and the flexible gasket is compressed between the clamping member and the protruding part.

In an exemplary embodiment, the flexible gasket is provided with a central hole, and an annular rib is disposed on the hole wall of the central hole, and the annular rib is in interference fit with a circumferential surface of the pin.

In an exemplary embodiment, the two protruding parts are provided with weight-reducing material-removed holes along the length direction of the protruding parts; the two lug components further include decorative sheets covering the weight-reducing material-removed holes.

In an exemplary embodiment, the circuit board is disposed to protrude from a side of the display screen away from the third frame, and the protruding part of the circuit board is provided with button contactor, and the front case is provided with button holes, and the display apparatus further includes buttons disposed in the button holes, and the buttons are disposed to trigger the button contactor when pressed.

In an exemplary embodiment, the display apparatus further includes a communication module disposed on an inner side of the front case or/and the rear case and electrically connected to the circuit board, and the communication module is configured to wirelessly communicate with external equipment.

After the drawings and the detailed descriptions are read and understood, the other aspects may be comprehended.

BRIEF DESCRIPTION OF DRAWINGS

The attached drawings are for providing a further understanding for technical schemes of the present disclosure and constitute a part of the description. They are for explaining the technical schemes of the present disclosure together with the embodiments of the present disclosure and do not constitute a limitation on the technical schemes of the present disclosure.

DETAILED DESCRIPTION

The technical solutions of the disclosure will be further described below in combination with the drawings through specific embodiments. It is to be understood that specific embodiments described here are used to explain the disclosure only, rather than intended to limit the disclosure. The embodiments and features in the embodiments in the present disclosure may be combined randomly if there is no conflict.

Figure 1:
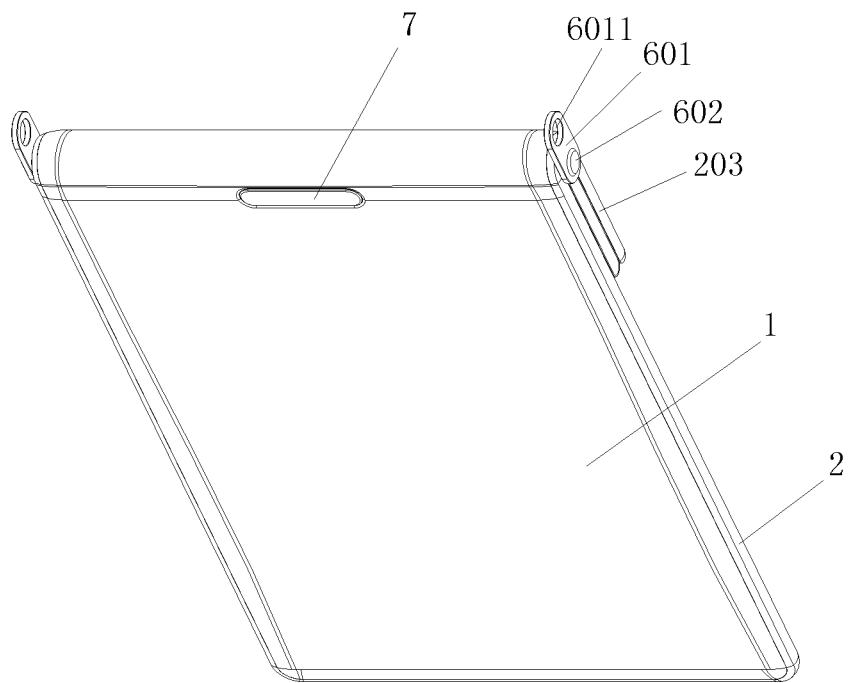
FIG. 1 is a schematic diagram of a structure of a display apparatus according to some embodiments of the present disclosure.
Figure 2:
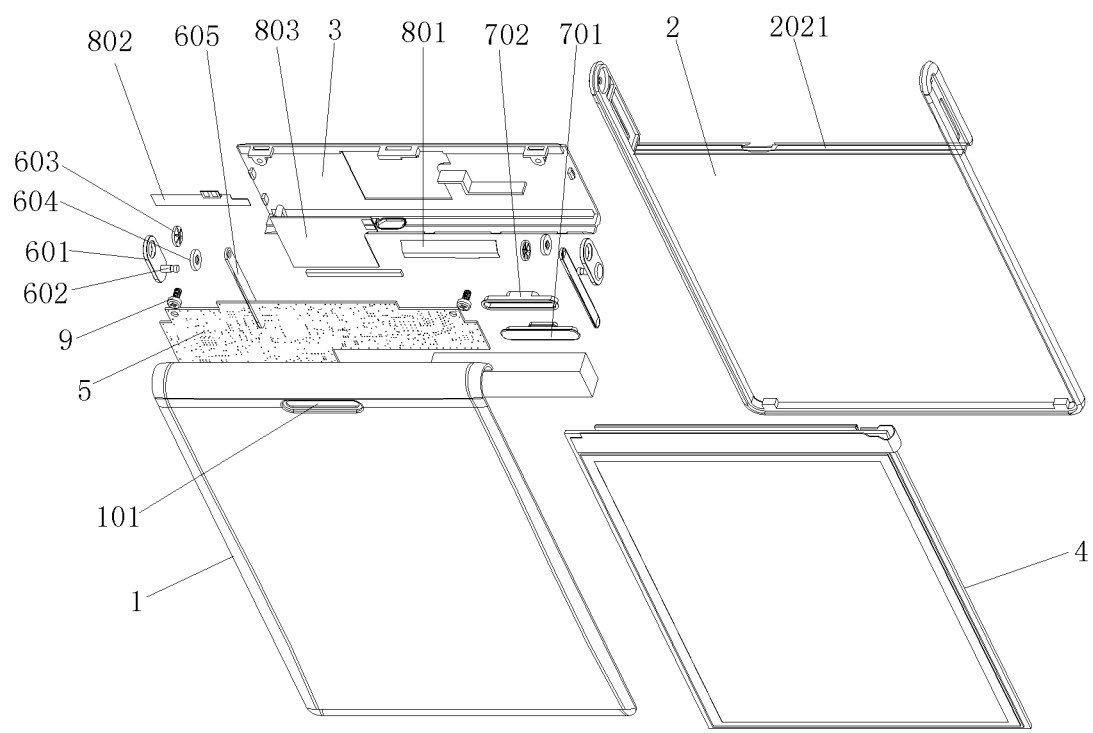
FIG. 2 is a schematic diagram of an explosive structure of a display apparatus in FIG. 1.
Figure 5:
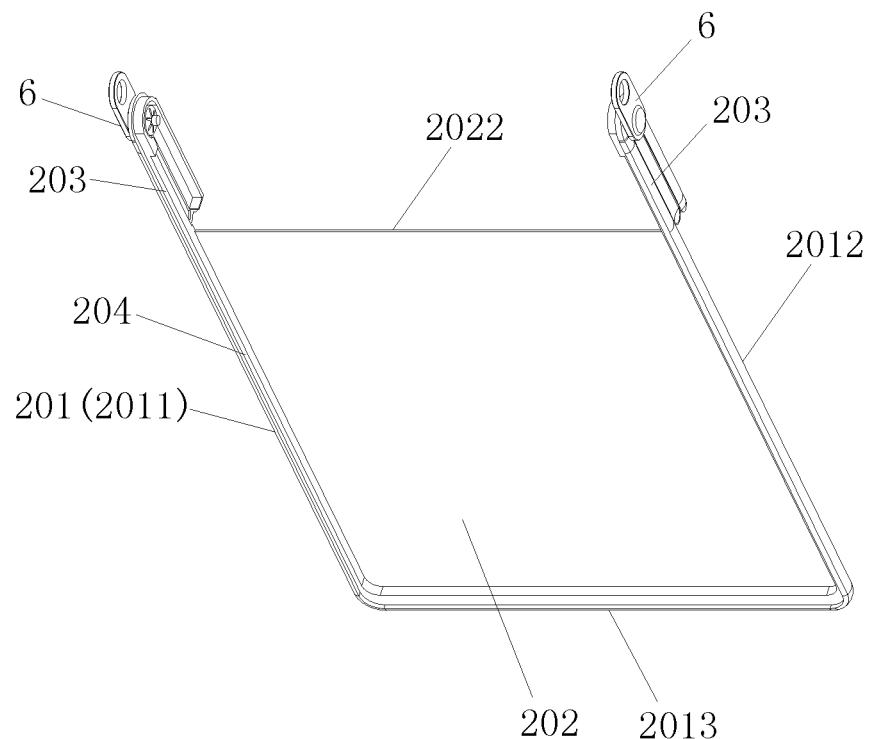
FIG. 5 is a schematic diagram of an assembly structure of a middle frame and a lug component in the display apparatus in FIG. 1.

As shown in FIG. 1, FIG. 2 and FIG. 5, an embodiment of the present disclosure provides a display apparatus, which includes housing components, a display screen 4 and a circuit board 5 disposed in the housing components, wherein the housing components includes a middle frame 2, a front case 1 and a rear case 3; the middle frame 2 includes a frame body 201 and a plate body 202; the frame body 201 includes a first frame 2011 and a second frame 2012 opposite to each other, and a third frame 2013 connected between the first frame 2011 and the second frame 2012; the frame body 201 disposed around a corresponding side of the plate body 202; wherein both the first frame 2011 and the second frame 2012 are provided with a protruding part 203 protruding from a first side 2022 (shown in FIG. 5) of the plate body 202; the rear case 3 is fixed between the two protruding parts 203 and connected to the first side 2022 of the plate body 202. The display screen 4 is disposed in the frame body 201 and fixed on the plate body 202. The circuit board 5 is disposed on a side of the display screen 4 away from the display side and fixedly connected to the rear case 3; the front case 1 is fixed in the frame body 201 and located on a display side of the display screen 4.

The display apparatus of the embodiment of the present disclosure may be applied to a badge and worn on the chest, and display information of the display screen 4 may be altered, so that the badge may be reused. In the whole display apparatus, a structural design of the middle frame 2, a matching mode between the middle frame 2 with the front case 1 and the rear case 3, and a layout of the circuit board 5 and the display screen 4 in the house assembly may make a thickness of the whole display apparatus smaller, lighter and thinner, thereby reduce the feeling of weight of the whole display apparatus.

In some exemplary embodiments, as shown in FIG. 5, the frame body 201 enclosed by the first frame 2011, the second frame 2012 and the third frame 2013 is generally U-shaped. The first frame 2011 and the second frame 2012 are parallel to each other, and both the first frame 2011 and the second frame 2012 are perpendicular to the third frame 2013.

Figure 6:
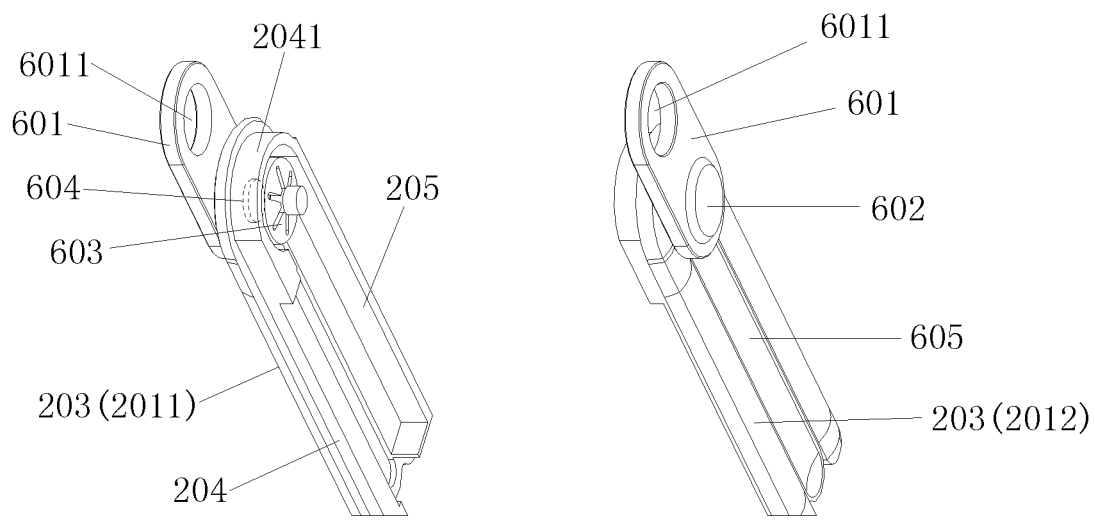
FIG. 6 is a schematic diagram of a partially enlarged structure of an assembly of two protruding parts of the middle frame respectively with two lug components in FIG. 5.

In some exemplary embodiments, as shown in FIGS. 5 and 6, the first frame 2011, the second frame 2012, and the third frame 2013 are all provided with first support ribs 204, and a part of an inner side of the front case 1 near an edge is supported and fixed on the first support rib 204. In an example of this embodiment, first support ribs 204 on the first frame 2011, the second frame 2012 and the third frame 2013 may all extend along length directions of corresponding frames and may be connected into an integrated structure. A double-sided adhesive (or glue) may be disposed on a side of the first support rib 204 facing the front case 1, and a part of an inner side of the front case 1 near an edge is supported on the first support rib 204 and fixed on the first support rib 204 by the double-sided adhesive (or glue).

In some exemplary embodiments, as shown in FIG. 1, the front case 1 is disposed to cover on the display screen 4. The front case 1 may include a transparent region in the middle and a non-transparent region around the transparent region, and the transparent region corresponds to the display region of the display screen 4. In this embodiment, the front case 1 is a solid body with a plate-like structure and may cover on the whole display screen 4. The transparent region of the front case 1 corresponds to the display region of the display screen 4, so that an image displayed on the display screen 4 may be viewed through the transparent region of the front case 1, and the non-transparent region of the front case 1 may cover the non-display region of the display screen 4, thus beautifying an appearance. In other examples, the front case 1 may have a frame-like structure and may cover on a peripheral non-display region on a display side of the display screen 4.

Figure 4:
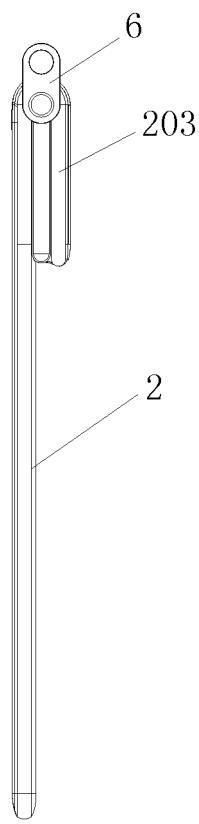
FIG. 4 is a schematic side view of a structure of a display apparatus in FIG. 1.

In some exemplary embodiments, as shown in FIG. 4, a width of the two protruding parts 203 in a direction perpendicular to the plate body 202 is greater than a thickness of the plate body 202, and both protruding parts 203 are disposed to protrude from a side of the plate body 202 away from the display screen 4, so that a certain space may be formed between the rear case 3 and the display screen 4 to accommodate a circuit board 5, a power supply, a communication module, etc. The rear case 3 may be provided with fixing holes 302 (two in the Figure), and the circuit board 5 may be fixed on the rear case 3 by fasteners (such as screws) 9.

Figure 3:
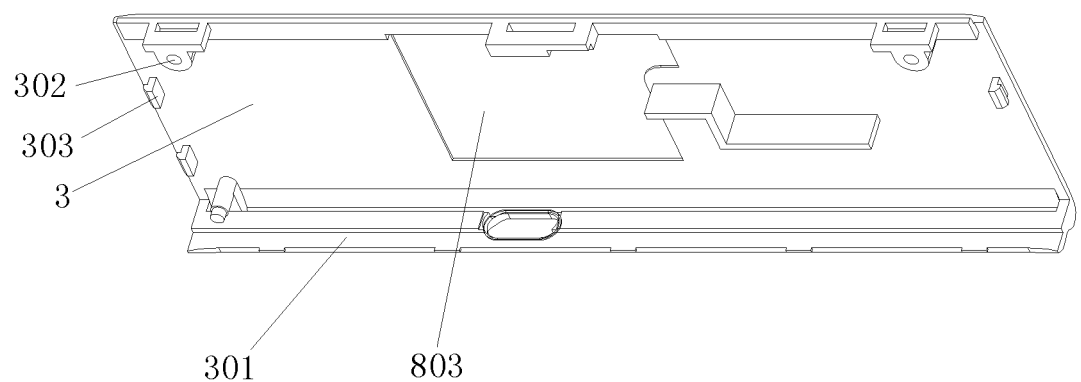
FIG. 3 is a schematic diagram of an assembly structure of a rear case of the display apparatus in FIG. 1 and a communication module.

In some exemplary embodiments, as shown in FIG. 2, FIG. 3 and FIG. 5, a first side 2022 of the plate body 202 may be provided with a folding rib 2021 extending toward a side of the plate body 202 away from the display screen 4, and a side of the rear case 3 connected to the first side 2022 of the plate body 202 is provided with a flanging 301 extending toward an inner side of the rear case 3, the flanging 301 is pressed against the folding rib 2021, and a side of the rear case 3 away from the first side 2022 of the plate body 202 is connected to a corresponding side of the front case 1. In this embodiment, the folding rib 2021 and the flanging 301 may be bonded and fixed by a double-sided adhesive or a glue.

In some exemplary embodiments, as shown in FIG. 6, opposite sides of the two protruding parts 203 are provided with second support ribs 205, and a part of an inner side of the rear case 3 near an edge is supported and fixed on the second support rib 205. In an example of this embodiment, a side of the second support rib 205 facing the rear case 3 may be provided with double-sided adhesives or glues to be bonded and fixed with an inner side of the rear case 3 near the edge. The second support rib 205 may extend along a length direction of the protruding part 203. Ends of the two protruding parts 203 away from the third frame 2013 may be provided with arc ribs 2041. The first supporting rib 204 and the second supporting rib 205 on the first frame 2011 may be connected as a whole by the arc-shaped ribs 2041 on the protruding portion 203 of the first frame 2011; the first supporting rib 204 and the second supporting rib 205 on the second frame 2012 may be connected as a whole by the arc-shaped ribs 2041 on the protruding portion 203 of the second frame 2012. The arc ribs 2041 on the two protruding parts 203 may be regarded as a part of the first support ribs 204 on the corresponding frames, and a part of the front case 1 supported on the arc ribs 2041 may be in a correspondingly bending shape. In an example of this embodiment, one or more buckles 303 (shown in FIG. 3) may be disposed on a part of an inner side of the rear case 3 closed to an edge, and the buckles 303 are clamped on the second support ribs 205, so that the rear case 3 may be more firmly fixed on the two protruding parts 203.

In some exemplary embodiments, as shown in FIG. 5 and FIG. 6, the display apparatus further includes two lug components 6 respectively disposed on the two protruding parts 203, and the lug component 6 include a lug plate 601 disposed at an end of the protruding parts 203 away from the third frame 2013, and the lug plate 601 is provided with a hanging hole 6011, and the hanging hole 6011 is disposed for connecting a hanging rope. Exemplarily, both ends of the hanging rope may be respectively connected to the hanging holes 6011 of the lug plates 601 of the two lug components 6, so that the display apparatus may be worn on the chest of a user through the hanging rope and used as a badge.

Figure 7:
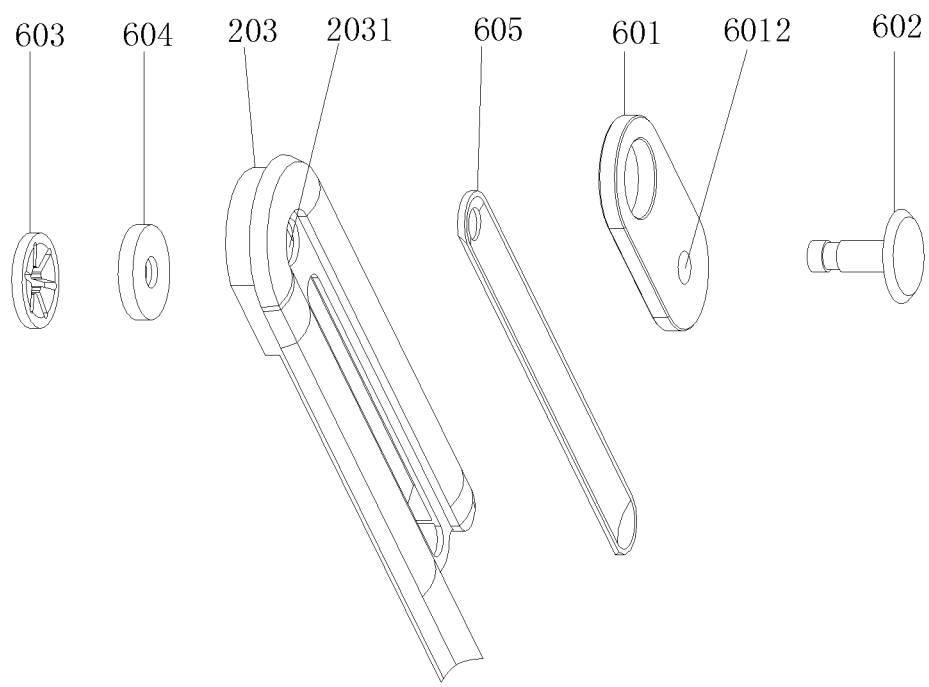
FIG. 7 is a schematic diagram of an explosive structure of the protruding part of the middle frame and the lug component in FIG. 6.

In some exemplary embodiments, as shown in FIG. 6 and FIG. 7, the protruding part 203 may be provided with a first connecting hole 2031; the lug plate 601 may be provided with a second connecting hole 6012; and the lug component 6 further includes a pin 602 and a clamping member 603, wherein the pin 602 is disposed through the first connecting hole 2031 and the second connecting hole 6012; an end is clamped on the lug plate 601, and the clamping member 603 is fixed on the other end of the pin 602 and clamped on the protruding part 203. In an example of this embodiment, the two lug plates 601 of the two lug components 6 are respectively connected to the sides of the two protruding parts 203 facing away to each other, and the clamping member 603 may prevent the pins 602 from moving in an axial direction, and the lug plates 601 may rotate on the pins 602. The first connecting hole 2031 may be disposed inside an annular rib, and correspondingly, the clamping member 603 is located inside the annular rib. In an example of this embodiment, a circumferential surface of the pin 602 may be provided with an annular clamping groove, and the clamping member 603 may be clamped in the annular clamping groove and clamped on the protruding part 203, so that the lug plate 601 and the protruding part 203 are tightly attached to ensure that the pin 602 may not move in the axial direction, and the lug plate 601 may rotate around the pin 602.

Figure 8:
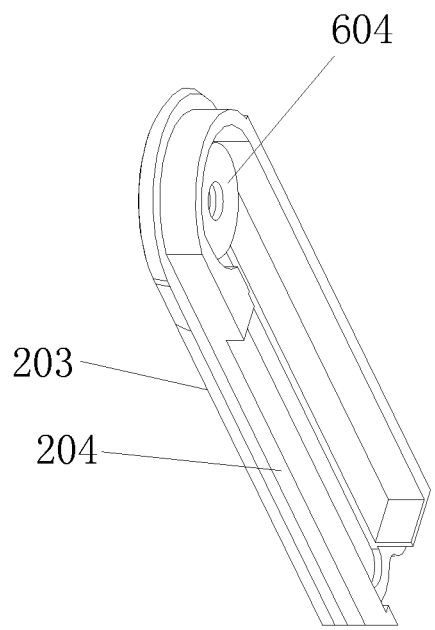
FIG. 8 is a schematic diagram of an assembly structure of the protruding part of the middle frame and a flexible gasket of the lug component in FIG. 7.
Figure 9:
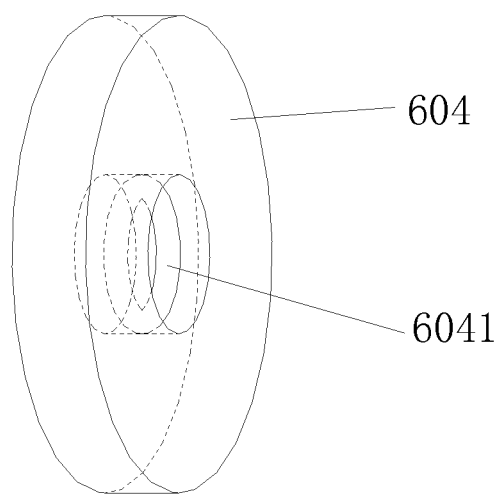
FIG. 9 is a schematic diagram of a structure of the flexible gasket of the lug component in FIG. 7.

In some exemplary embodiments, as shown in FIG. 6, FIG. 7, and FIG. 8, the lug component 6 may further include a flexible gasket 604 disposed through the pin 602, and the flexible gasket 604 is compressed between the clamping member 603 and the protruding part 203. In an example of this embodiment, as shown in FIG. 9, the flexible gasket 604 is provided with a central hole, and an annular rib 6041 is disposed on the hole wall of the central hole, and the annular rib 6041 is in interference fit with a circumferential surface of the pin 602, so that water may be prevented from penetrating into the whole machine from the circumferential surface of the pin 602, thus playing a sealing and waterproof role. A material of the flexible gasket 604 may be silica gel, etc. The flexible gasket 604 and the protruding part 203 may be bonded and fixed by waterproof double-sided adhesives or glues.

In some exemplary embodiments, as shown in FIG. 6 and FIG. 7, the two protruding parts 203 may be provided with weight-reducing material-removed holes along a length direction of the protruding parts 203, and the lug component 6 may further include a decorative sheet 605 covering the weight-reducing material-removed holes, and the decorative sheet 605 is disposed through the pin 602 through the third connecting hole in the decorative sheet 605 and is compressed between the lug plate 601 and the protruding parts 203. The decorative sheet 605 and the protruding part 203 may be bonded and fixed by waterproof double-sided adhesives or glues.

In some exemplary embodiments, the circuit board 5 is disposed to protrude from a side of the display screen 4 away from the third frame 2013, and a protruding part of the circuit board 5 is provided with button contacts, and the front case 1 is provided with a button hole 101 (shown in FIG. 2). As shown in FIG. 1, the display apparatus further includes a button 701 disposed in the button hole 101, and the button 701 is configured to trigger the button contactor when pressed. In an example of this embodiment, a button cover 702 (shown in FIG. 2) may be sleeved on a part of the button 701 located in the front case 1 to form a button assembly, and the button assembly is installed in the button hole 101. The button cover 702 may be made of flexible materials (such as silica gel), which may play a waterproof role.

In some exemplary embodiments, the display apparatus further includes a communication module disposed on an inner side of the front case 1 or/and the rear case 3 and electrically connected to the circuit board 5, and the communication module is configured to wirelessly communicate with external equipment. In an example of this embodiment, the communication module may be a Bluetooth antenna, a near Field Communication (NFC) antenna, etc. Through the built-in circuit board 5 and communication module, the display apparatus may wirelessly communicate with the external equipment to change display information of the display screen 4. The display of the display screen 4 or the communication with external devices may be controlled by pressing the button 701 on the front case 1.

In some exemplary embodiments, as shown in FIG. 2 and FIG. 3, an NFC antenna 803 may be bonded to an inner side of the rear case 3, and a public NFC antenna may be used to reduce a debugging cost and shorten a development cycle. An area of the NFC antenna 803 may be verified and tested to meet design requirements. A connector, such as a POGO PIN, may be disposed at a position of the circuit board 5 corresponding to a contact point of the NFC antenna 803 to ensure good contact with the NFC antenna 803 and good signal of the NFC antenna 803, and a design cost may be reduced without adding additional structural members or structural features. One or more (for example, two) Bluetooth antennas, such as a first Bluetooth antenna 801 and a second Bluetooth antenna 802 (shown in FIG. 2), may be bonded to an inner side of the front case 1, and a plurality of Bluetooth antennas may be compatible with different design schemes, which may reduce a cost of product revision. The Bluetooth antenna on the front case 1 is disposed corresponding to a protruding part of the circuit board 5, so as to facilitate line connection with the circuit board 5. The display apparatus further includes a power supply disposed in the housing components, and a notch may be disposed at an edge of the circuit board 5, and the power supply may be disposed at the notch and between the display screen 4 and the rear case 3. The display screen 4 may be an electrophoretic display (EPD) screen, a thickness of which may be about 2 mm, and a width of a part of the frame body 201 of the middle frame 2 except the two protruding parts in a direction perpendicular to the EPD screen may be about 3 mm, which may optimize an appearance of a whole machine and make the whole machine thinner. In the description of embodiments of the present disclosure, unless otherwise explicitly specified or defined, the terms "connect", "fixed connection", "install" and "assemble" are to be understood broadly, for example, a connection may be a fixed connection, or a detachable connection, or an be integral connection. The terms "install", "connect" and "fixed connection" may refer to a direct connection, or an indirect connection through an intermediate medium, or an internal connection between two elements. Those of ordinary skills in the art may understand the specific meanings of the above mentioned terms in the present disclosure according to specific context.

What we claim is:

1. A display apparatus, comprising:
    housing components, and a display screen and a circuit board disposed in the housing components, wherein the housing components comprise a middle frame, a front case and a rear case;
    the middle frame includes a frame body and a plate body, wherein the frame body includes a first frame and a second frame opposite to each other, and a third frame connected between the first frame and the second frame; the frame body is disposed around a corresponding side of the plate body, and both the first frame and the second frame are provided with protruding parts protruding from a first side of the plate body;
    the rear case is fixed between the two protruding parts and connected to the first side of the plate body; the display screen is disposed in the frame body and fixed on the plate body; the circuit board is disposed on a side of the display screen away from a display side and fixedly connected to the rear case; the front case is fixed in the frame body and located on the display side of the display screen.

2. The display apparatus of claim 1, wherein the frame body is substantially U-shaped; the first frame and the second frame are disposed parallel to each other, and are perpendicular to the third frame respectively.

3. The display apparatus of claim 1, wherein the first frame, the second frame, and the third frame are all provided with first support ribs, and a part of an inner side of the front case close to an edge is supported and fixed on the first support rib.

4. The display apparatus of claim 3, wherein the first support ribs on the first frame, the second frame and the third frame all extend along length directions of corresponding frames and are connected into an integrated structure.

5. The display apparatus of claim 2, wherein the front case is disposed to cover the display screen, and includes a transparent region in the middle and a non-transparent region around the transparent region, and the transparent region corresponds to the display region of the display screen.

6. The display apparatus of claim 5, wherein the front case is a whole solid body with a plate-like structure or a frame-like structure.

7. The display apparatus of claim 5, wherein a width of the two protruding parts in a direction perpendicular to the plate body is larger than a thickness of the plate body, and both protruding parts are disposed to protrude from a side of the plate body away from the display screen.

8. The display apparatus of claim 1, wherein a first side of the plate body is provided with a folding rib extending toward a side of the plate body away from the display screen, and a side of the rear case connected to the first side of the plate body is provided with a flanging extending toward an inner side of the rear case, the flanging presses against the folding rib, and a side of the rear case away from the first side of the plate body is connected to a corresponding side of the front case.

9. The display apparatus of claim 8, wherein both opposite sides of the two protruding parts are provided with second support ribs, and a part of an inner side of the rear case close to an edge is supported and fixed on the second support ribs.

10. The display apparatus of claim 9, wherein the second support ribs extend along length directions of the two protruding parts, ends of the two protruding parts away from the third frame are provided with arc ribs; first support ribs on the first frame and the second support ribs are connected to a whole by the arc ribs on the protruding parts of the first frame, and first supporting ribs on the second frame and second supporting ribs are connected to a whole by the arc ribs on the protruding parts of the second frame.

11. The display apparatus of claim 9, wherein a buckle is disposed on a part of an inner side of the rear case close to an edge, and the buckle snap-fits the second support rib.

12. The display apparatus of claim 1, further including two lug components respectively disposed on the two protruding parts, and a lug component comprises lug plate disposed at an end of a protruding part away from the third frame, and the lug plate is provided with a hanging hole, and the hanging hole is disposed for connecting a hanging rope.

13. The display apparatus of claim 12, wherein the protruding part is provided with a first connecting hole; the lug plate is provided with a second connecting hole; and the lug component further comprises a pin and a clamping member, wherein the pin is disposed through the first connecting hole and the second connecting hole; an end of the pin is clamped on the lug plate, and the clamping member is fixed on the other end of the pin and clamped on the protruding part.

14. The display apparatus of claim 13, wherein two lug plates of the two lug components are respectively connected to sides of the two protruding parts facing away from each other, and the clamping member is disposed to prevent the pin from moving in an axial direction, and the two lug plates is capable of rotating on the pin.

15. The display apparatus of claim 13, wherein a circumferential surface of the pin is provided with an annular clamping groove, and the clamping member snap-fits into the annular clamping groove and is stuck in a corresponding protruding part.

16. The display apparatus of claim 13, wherein the lug component further includes a flexible gasket disposed through the pin, and the flexible gasket is compressed between the clamping member and the protruding part.

17. The display apparatus of claim 16, wherein the flexible gasket is provided with a central hole, and an annular rib is disposed on a hole wall of the central hole, and the annular rib is in interference fit with a circumferential surface of the pin.

18. The display apparatus of claim 16, wherein the two protruding parts are provided with weight-reducing material-removed holes along a length direction of the protruding parts; the two lug components further comprise decorative sheets covering the weight-reducing material-removed holes.

19. The display apparatus of claim 1, wherein the circuit board is disposed to protrude from a side of the display screen away from the third frame, and the protruding parts of the circuit board are provided with button contactors, and the front case is provided with button holes, and the display apparatus further comprises buttons disposed in the button holes, and the buttons are disposed to trigger the button contactors when pressed.

20. The display apparatus of claim 1, further comprising:
a communication module disposed on an inner side of the front case or/and the rear case and electrically connected to the circuit board, and the communication module is configured to wirelessly communicate with external equipment.

* * * * *